(12) United States Patent
McCord

(10) Patent No.: US 7,156,424 B2
(45) Date of Patent: Jan. 2, 2007

(54) COUPLING ASSEMBLY WITH RETENTION MECHANISM

(75) Inventor: James D. McCord, Orange Park, FL (US)

(73) Assignee: Parker-Hannifin Corporation, Cleveland, OH (US)

( * ) Notice: Subject to any disclaimer, the term of this patent is extended or adjusted under 35 U.S.C. 154(b) by 324 days.

(21) Appl. No.: 10/794,290

(22) Filed: Mar. 5, 2004

(65) Prior Publication Data
US 2005/0194786 A1   Sep. 8, 2005

(51) Int. Cl.
*F16L 55/00*   (2006.01)
(52) U.S. Cl. ............................ 285/92; 285/81; 285/319; 411/329
(58) Field of Classification Search ............... 285/81, 285/89, 92, 319; 411/326, 327, 329
See application file for complete search history.

(56) References Cited

U.S. PATENT DOCUMENTS

| 4,834,667 | A |   | 5/1989 | Fowler et al. |
| 5,215,336 | A |   | 6/1993 | Worthing |
| 5,496,189 | A |   | 3/1996 | Over et al. |
| 5,538,378 | A | * | 7/1996 | Van Der Drift ............. 411/329 |
| 6,557,900 | B1 |  | 5/2003 | Austin |
| 6,857,665 | B1 |  | 2/2005 | Vyse et al. |

* cited by examiner

*Primary Examiner*—Aaron Dunwoody
(74) *Attorney, Agent, or Firm*—Renner, Otto, Boisselle & Sklar, LLP

(57) ABSTRACT

A coupling assembly includes a female fitting assembly comprising a tube body having a nut that is axially and rotatably movable relative to the tube body, and a generally U-shape spring fixedly connected to the nut. The spring has a pair of laterally spaced arms that straddle the tube body when the nut is inserted over the tube body and spring arm end portions that are engageable with serrations on opposite sides of the tube body. The spring arm end portions are shaped to provide more resistance to turning of the nut in the loosening/back-off direction when the nut is fully torqued on a male fitting assembly than during tightening of the nut on the male fitting assembly.

24 Claims, 3 Drawing Sheets

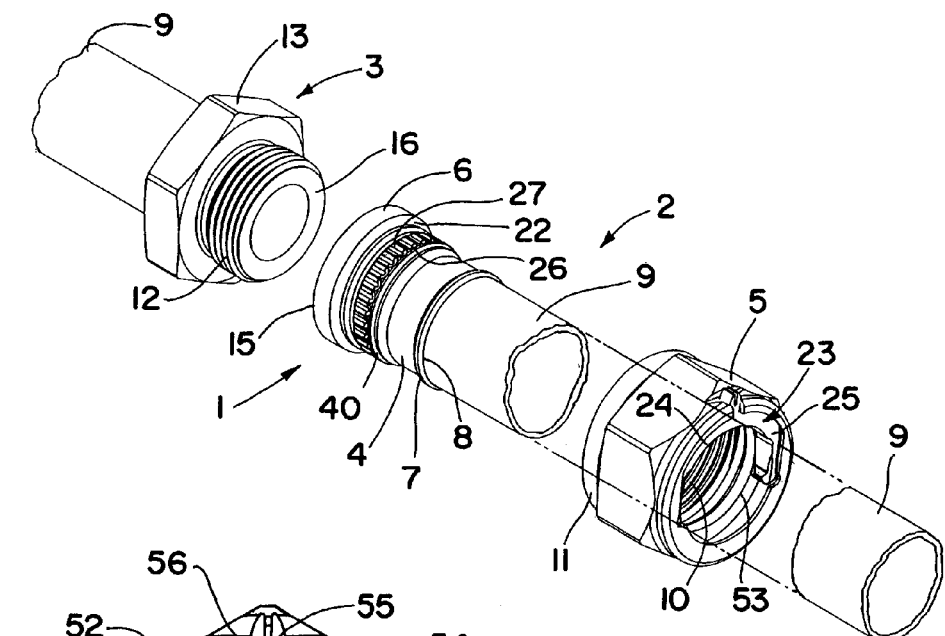
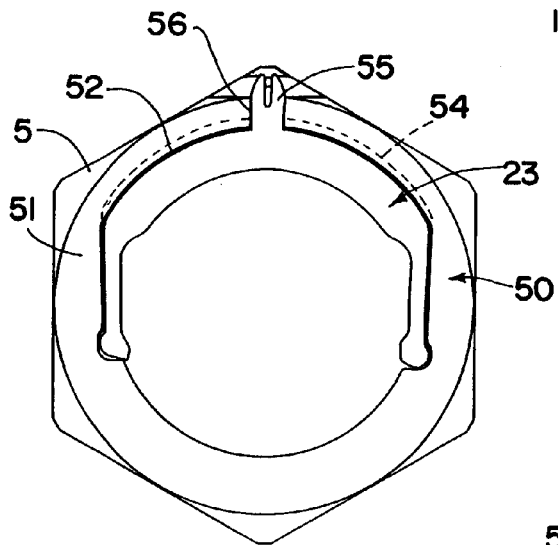
FIG. 1
FIG. 2
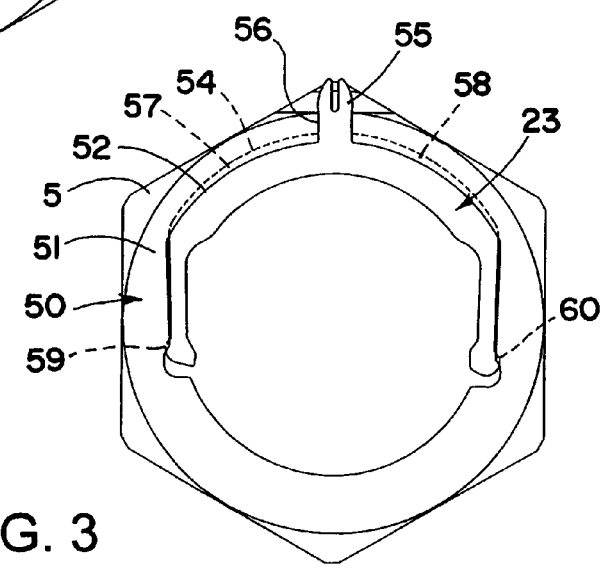
FIG. 3

COUPLING ASSEMBLY WITH RETENTION MECHANISM

FIELD OF THE INVENTION

This invention relates generally to a coupling assembly including a retention mechanism for securing two component parts together and more particularly for preventing loosening of the component parts during use of the coupling assembly while still permitting the coupling assembly to be disassembled for maintenance and/or repair and reassembled as desired.

BACKGROUND OF THE INVENTION

A problem associated with the use of nuts with fasteners and couplings is that of the nut backing off or loosening during use due to vibrational, environmental and other dynamic factors. This problem is particularly apparent in the aircraft industry where vibration and stress can cause loosening of fittings due to nut back-off.

Various methods are commonly used to resist unwanted nut back-off including, for example, locking washers, spring washers, prevailing torque threads, deformed threads, plastic thread inserts, arraerobic adhesives, double-nutting and locking pins.

For fluid couplings and the like, the most common method of preventing unwanted nut loosening is to use a safety wire to resist nut rotation. However, safety wire installation is costly because of the labor involved in affixing the safety wire to the nut and to an adjacent component after tightening of the nut. Also, the safety wire must be cut if the particular fitting requires routine retightening and/or maintenance or repair.

There are other known types of retention mechanisms for retaining the nut to the mating half (male half) of a fluid coupling. One such retention mechanism is disclosed in U.S. Pat. No. 5,215,336, and includes a serrated annular surface on a first member and fastening threads adjacent a bearing surface, and a flexible projection or projections or a complementary configuration to the serrated annular surface on a second member. The second member also includes fastening threads and a bearing surface. When the respective threads engage, they provide the primary preloading force to the bearing surface, while simultaneously the projections and serrated surface provide a retention force to insure a positive coupling.

Another such retention mechanism is disclosed in U.S. Pat. No. 6,557,900, and includes a nut locking device for locking a nut to the female coupling half of a coupling assembly. This has the advantage that the locking female assembly can be used with standard male fittings made by virtually all manufacturers and also retrofitted on fittings used in previously installed fluid couplings.

However, there is a continuing need for a retention mechanism for a coupling assembly that is simpler in construction than previous known retention mechanisms and provides a desired amount of resistance to back-off of the coupling assembly during use and still permits the coupling assembly to be disassembled when needed for maintenance and/or repair and reassembled as many times as desired.

Also there is a need for such a retention mechanism that prevents the back-off torque of the coupling assembly from dropping below a predetermined level even after the coupling assembly has been assembled and disassembled a number of times.

SUMMARY OF THE INVENTION

The coupling assembly of the present invention includes a retention mechanism that provides a desired amount of resistance to loosening of the component parts of the coupling assembly during use and still permits the coupling assembly to be disassembled as needed for maintenance and/or repair or the like and then reassembled as many times as desired.

In accordance with one aspect of the invention, the female coupling member of the coupling assembly may comprise a tube body having a serrated annular surface, a nut axially and rotatably movable relative to the tube body, and a spring fixedly attached to the nut. The spring may be generally U-shape, including a pair of laterally spaced arms with radially inwardly extending end portions engageable with the serrations on opposite sides of the tube body shaped to provide more resistance to turning of the nut in the loosening/back-off direction than in the tightening direction when the spring arm end portions are in full contact with the serrations.

In accordance with another aspect of the invention, the spring arm end portions are shaped to provide more contact area with the serrations and may have a steeper slope during turning of the nut in the back-off direction than in the tightening direction, causing more resistance to turning of the nut in the back-off direction than in the tightening direction after the nut has been fully torqued on the male coupling member.

In accordance with another aspect of the invention, the serrations are generally symmetrical in shape and have rounded surfaces to minimize wear due to contact of the spring arm end portions with the serrations during both tightening and back-off of the nut.

In accordance with another aspect of the invention, the spring may compensate for the elliptical pattern of the nut during back-off, causing the spring arms to engage the serrations and provide increased resistance to turning of the nut during back-off.

In accordance with another aspect of the invention, the serrations may be formed by grooves in an annular surface of the tube body.

In accordance with another aspect of the invention, the rear ends of the grooves and trailing edges of the spring arm end portions may have substantially matching radiuses to cause quick lifting of the spring arm end portions out of the grooves during back-off of the nut for quick release of the coupling assembly.

In accordance with another aspect of the invention, the nut may be hand tightenable part way onto the male coupling member before the spring arm end portions engage the serrations to allow the operator to fully align and start the fitting without chance of stripping the lead threads.

In accordance with another aspect of the invention, the tube body may have a spring centering diameter for centering the nut and spring assembly on the tube body during initial hand tightening of the nut onto the male coupling member.

In accordance with another aspect of the invention, the leading edge of the spring arm end portions and the shoulder at the rear end of the serrated annular surface on the tube body may have substantially matching chamfers to cause a ramping action of the spring arm end portions up onto the serrated annular surface during continued tightening of the nut.

In accordance with another aspect of the invention, the spring arms are preloaded to cause the spring arm end portions to fully engage the serrations when the nut is in the fully locked position.

In accordance with another aspect of the invention, when the nut is at the fully torqued position, a visual torque indicator may be provided on the tube body that becomes visible to provide a visual indicator only when the nut is at the fully torqued position.

In accordance with another aspect of the invention, the back side of the nut may have a clearance profile that is shaped to allow the spring to be inserted into a cavity in the nut only when the front side of the spring is facing the nut cavity, thereby preventing the spring from being inserted backwards into the nut.

In accordance with another aspect of the invention, the nut may have a radial recess into which the spring is radially outwardly movable after being inserted axially into the nut for retaining the spring inside the nut.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is an exploded perspective view of one form of coupling assembly in accordance with the present invention;

FIG. 2 is an enlarged end elevation view of the back side of the coupling assembly nut showing the coupling assembly spring in proper alignment with the clearance profile of the nut that allows the spring to be inserted axially into the nut;

FIG. 3 is an enlarged end elevation view similar to FIG. 2 but showing the spring inserted into the nut and moved radially outwardly into a radial recess in the nut for retaining the spring inside the nut;

DETAILED DESCRIPTION OF THE INVENTION

Figure 4:
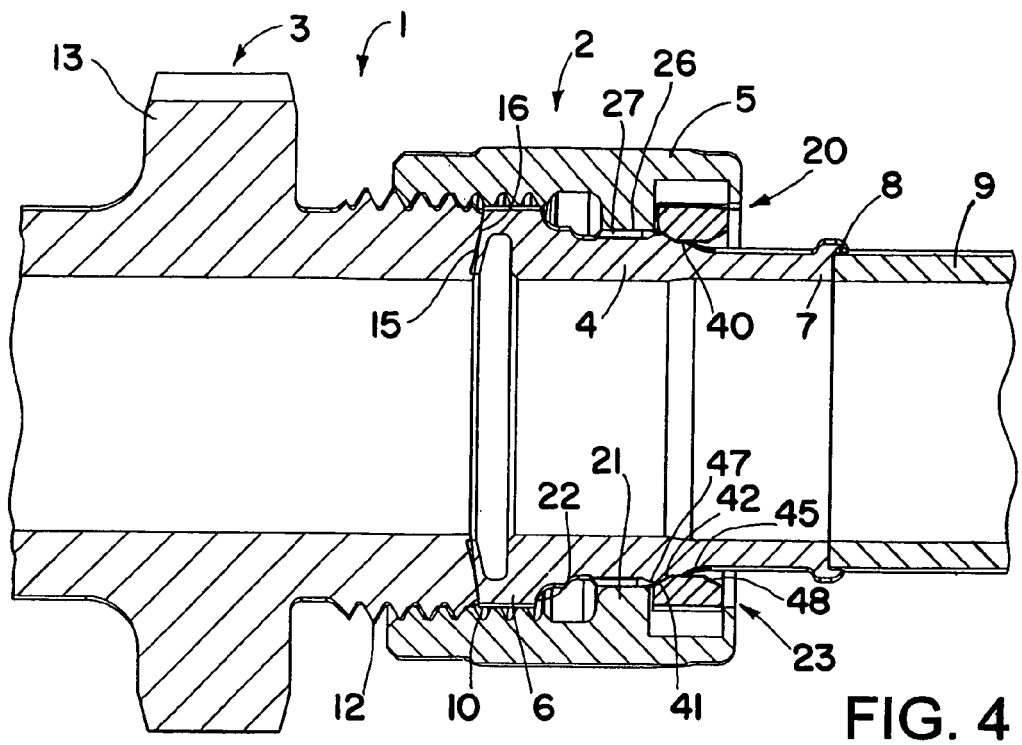
FIG. 4 is an enlarged longitudinal section through the coupling assembly of the present invention showing the nut of the female coupling member hand tightened part way onto the male coupling member.

Referring now in detail to the drawings, wherein the same reference numbers are used to designate like parts, and initially to FIG. 1, there is shown one form of coupling assembly 1 in accordance with this invention including a female fitting assembly 2 and male fitting assembly 3 which when connected together, form a fluid tight coupling therebetween as described hereafter. The female fitting assembly 3 includes a tube body 4 surrounded by a nut 5. Both the tube body and nut may be made from any high strength materials including plastics, metal alloys or composites thereof, but are preferably made from a high strength metal alloy.

Figure 5:
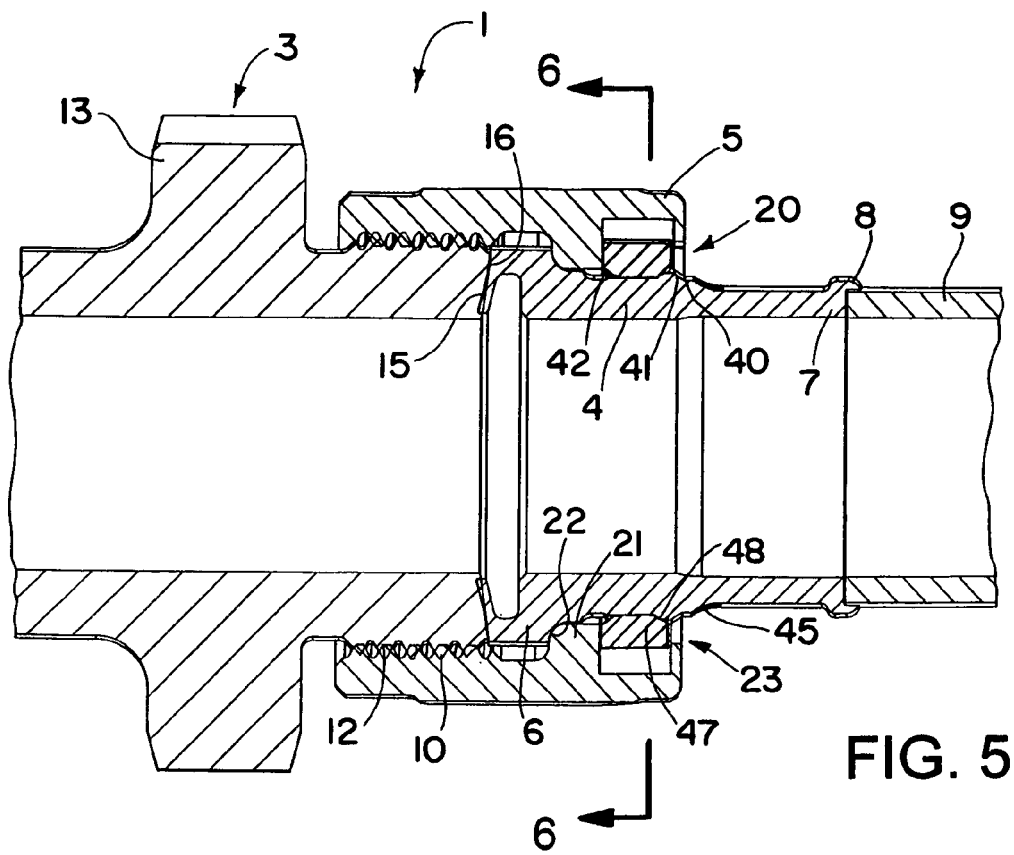
FIG. 5 is an enlarged longitudinal section through the coupling assembly similar to FIG. 4 but showing the nut fully torqued onto the male coupling member.

Tube body 4 is a cylindrical hollow tube that includes an enlarged front end 6 and a rear end 7 having a shoulder 8 to which a length of tubing 9 may be affixed as by welding, clamping, threading, adhesive or the like. The nut 5 of the female fitting assembly 2 includes an internal threaded portion 10 adjacent its front end 11 which when inserted over the tube body from the rear end 7, may be moved forwardly relative to the tube body to extend axially outwardly beyond the enlarged front end 6 thereof for threaded engagement with external threads 12 on the adjacent end of the male coupling member 13 of the male fitting assembly 3. The male coupling member may also have a length of tubing 9 affixed thereto or may be connected to some other member as by welding, clamping, threading, adhesive or the like. During tightening of the nut, sealing faces 15, 16 on the adjacent ends of the female tube body 4 and male coupling member 13 are drawn into mating engagement with each other as shown in FIGS. 4 and 5 to form a fluid tight seal therebetween.

To prevent unwanted loosening of the coupling assembly 1 during use and still permit the female fitting assembly 2 to be disconnected from the male coupling member 13 for maintenance and/or repair or the like and then reassembled as many times as desired, a retention mechanism 20 is provided on the female fitting assembly for resisting back-off of the nut after the nut has been fully torqued on the male coupling member. Full torquing occurs when, during tightening of the nut, an internal flange 21 of the nut is drawn into engagement with the rear shoulder 22 of enlarged front end 6 of tube body 4 as shown in FIG. 5.

Figure 6:
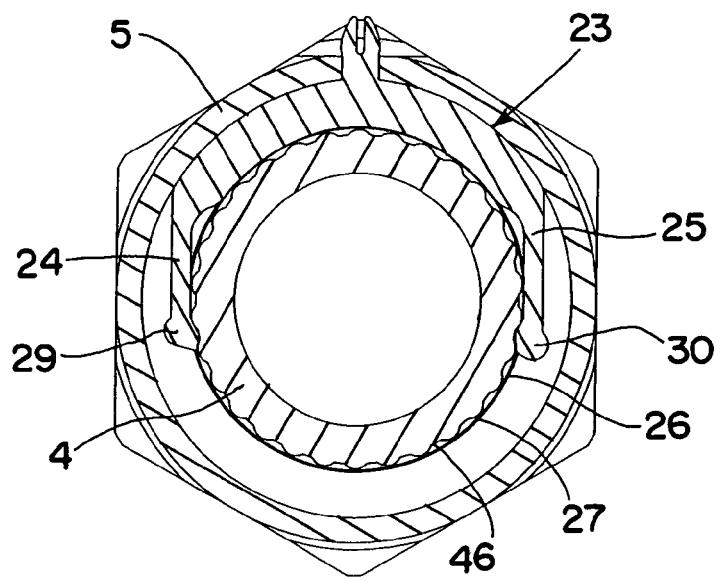
FIG. 6 is a transverse section through the female coupling member of FIG. 5, taken generally on the plane of the line 6—6 thereof, showing full contact of the spring arm end portions with the serrations in the annular surface of the tube body.

In the embodiment disclosed herein, retention mechanism 20 includes a generally U-shape spring 23 that is fixedly connected to the nut as described hereafter. As can be seen in FIGS. 1 and 6, spring 23 has a pair of laterally spaced arms 24, 25 that extend in substantially the same direction on opposite sides of the tube body 4 when the nut 5 is inserted over the tube body from the rear end. On the tube body is a non-threaded exterior annular surface 26 having a plurality of circumferentially spaced, axially extending serrations 27 that are engageable by the spring arm end portions 29, 30 on opposite sides of the tube body during turning of the nut relative to the tube body.

Figure 7:
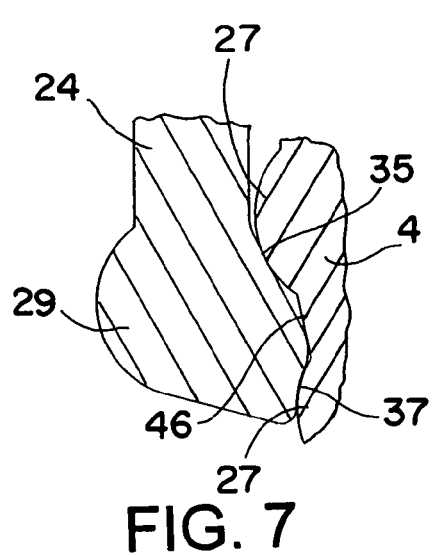
FIGS. 7 and 8 are enlarged fragmentary sections of the spring arm end portions and serrations of FIG. 6 showing in greater detail the engagement of the spring arm end portions with the serrations when the nut is in the fully locked position.
Figure 8:
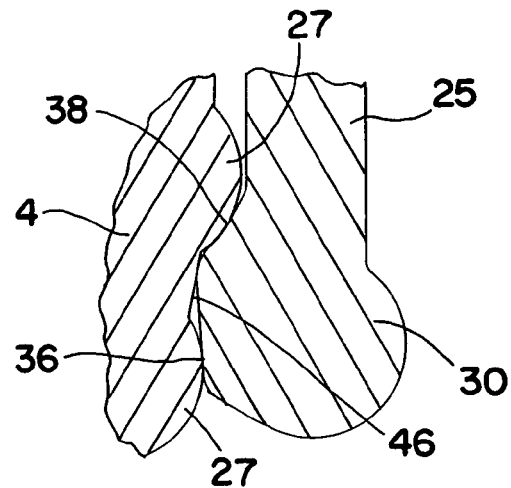

Referring further to FIG. 6, and also to FIGS. 7 and 8, the serrations 27 are desirably substantially symmetrical in shape and have convex rounded axially extending sides to minimize wear due to contact of the spring arm end portions 29, 30 with the serrations during both tightening and back-off of the nut. Also the spring arm end portions 29, 30 are shaped to provide more contact area with the serrations and a steeper slope during turning of the nut in the back-off direction than in the tightening direction, causing more resistance to turning of the nut in the back-off direction after the nut has been fully torqued on the male coupling member than in the tightening direction. More particularly, the surfaces 35, 36 of the spring arm end portions 29, 30 that contact the serrations during turning of the nut in the tightening direction are substantially flat to establish substantially line contact with the serrations in the tightening direction to reduce the amount of friction therebetween. Also surfaces 35, 36 may extend at a low angle relative to the radius of curvature of the serrations to further reduce the resistance to turning of the nut in the tightening direction.

In contrast, the surfaces 37, 38 of the spring arm end portions 29, 30 that contact the serrations during turning of the nut in the loosening direction are curved to substantially match the curvature of the serrations to establish a larger surface area contact with the serrations in the loosening direction to increase the amount of friction therebetween. Also surfaces 37, 38 may extend at a steeper angle relative to the radius of curvature of the serrations than the surfaces 35, 36 of the spring arm end portions, thus providing more resistance to turning of the nut in the back-off direction than in the tightening direction. Further, the spring arms 24, 25 are preloaded to cause the spring arm end portions 29, 30 to engage the minor diameter of the serrations 27 when the nut is in the fully locked position shown in FIGS. 5–8.

During back-off of the nut, the spring 23 also compensates for the elliptical pattern that the nut demonstrates due to thread and other part tolerances, which allows the tension and compression arms 24 and 25 of the spring (in the loosening direction) to engage the tops of the serrations at the same time as shown in FIG. 6 to provide additional resistance to turning of the nut in the back-off direction. Further, because there are no sharp edges on the serrations 27 that could break off or rapidly wear during tightening and untightening of the nut, the amount of torque required to back off the nut when the nut is in the fully locked position is relatively consistent and doesn't drop below a predetermined level over time, for example, nine inch pounds.

During initial tightening of the nut 5 on the male coupling member 13, the length of the nut relative to the tube body is such that the spring 23 is not yet expanded over the serrated annular surface 26 of the tube body. This has the advantage that the nut can be hand tightened part way onto the male coupling member, for example two full threads, before the spring arm end portions 29, 30 are expanded to allow the operator to fully align and start the fitting without chance of stripping the lead threads. Also tube body 4 may have a smaller spring centering diameter 40 than the serrated annular surface 26 adjacent the rear end of the annular surface 26 for self-centering of the nut and spring assembly on the spring centering diameter as shown in FIG. 4 during the initial hand tightening of the nut on the male coupling member.

At the fully hand-tightened position of the nut, shown in FIG. 4, a wrench must be applied to the nut to tighten the nut further to cause the spring to expand over the shoulder 41 between the serrated annular surface 26 and spring centering diameter 40 and onto the serrated annular surface. To facilitate expansion of the spring onto the serrated annular surface, the leading edges 42 of the spring arm end portions and the shoulder 41 at the rear end of the serrated annular surface may have substantially matching chamfers to cause a ramping action of the spring arm end portions up onto the serrated annular surface during further tightening of the nut. As the nut continues to move axially in the tightening direction, the spring arm end portions 29, 30 will fully engage the serrations 27 at the full torque up position shown in FIGS. 5–8. Moreover, when the nut is at the fully torqued position, a visual torque indicator 45 on the tube body adjacent the rear of the spring centering diameter 40 becomes visible to provide a visual indication that the nut is at the fully torqued position. Visual torque indicator 45 may comprise, for example, a band of a contrasting color for easy visibility when the nut is at the fully torqued position.

During initial tightening of the nut, the visual torque indicator 45 is covered by the nut 5 as shown in FIG. 4 and is thus not visible.

The serrations 27 may be formed as by providing circumferentially spaced axially extending grooves 46 in the annular surface 26 of the tube body. Moreover, the rear ends 47 of the grooves and trailing edges 48 of the spring arm end portions 29, 30 may have substantially matching radiuses as shown in FIG. 5 to cause quick lifting of the spring arm end portions out of the grooves during back-off of the nut for quick release of the coupling assembly once the nut is initially backed off from the male coupling member.

During both tightening and loosening of the nut, an audible clicking sound is created when the spring arm end portions are in engagement with the serrations, signaling that the nut is moving into or out of the fully locked position.

Spring 23 may be fixedly attached to nut 5 as by providing a clearance profile 50 in the back side 51 of the nut that is shaped to allow the spring to be inserted into a cavity 52 in the nut only when the front side of the spring is facing the nut cavity 52 as shown in FIG. 2, thereby preventing the spring from being inserted backwards into the nut. Spring 23 may be inserted by hand axially into the nut cavity 52 through the clearance profile of the nut until it contacts a shoulder 53 on the nut inner diameter (see FIG. 1). Then the spring may be moved radially outwardly into a radial recess 54 in the nut to cause an outwardly protruding fin 55 at the approximate center of the spring intermediate where the two arms are connected together to snap lock into a radial slot 56 in the nut as schematically shown in FIG. 3. When in this position, portions 57–60 of the spring will be shrouded by the nut end wall 51 to lock the spring in position against removal from the nut during tightening of the nut on the male coupling member.

Although the invention has been shown and described with respect to a certain embodiment, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A female fitting assembly for connecting to a male fitting assembly to form a fluid tight connection therebetween, the female fitting assembly comprising a tube body having a non-threaded exterior annular surface containing a plurality of circumferentially spaced axially extending serrations, and a nut axially and rotatably movable relative to the tube body, the nut having a generally U-shape spring fixedly connected to the nut, the spring having a pair of laterally spaced arms that extend in substantially the same direction on opposite sides of the tube body when the nut is inserted over the tube body, the spring arms having end portions that are engageable with the serrations on the opposite sides of the tube body to provide increased resistance to turning of the nut relative to the tube body.

2. The assembly of claim 1 wherein the serrations are symmetrical, and the spring arm end portions are shaped to provide less resistance to turning of the nut in a tightening direction when threaded onto a male fitting assembly than in the back-off direction when the nut is fully torqued on the male fitting assembly.

3. The assembly of claim 2 wherein the spring arm end portions have more contact area with the serrations in the back-off direction than in the tightening direction, causing more resistance to turning of the nut in the back-off direction than in the tightening direction.

4. The assembly of claim 2 wherein both arms of the spring engage the serrations during back-off of the nut when the nut is fully torqued on a male fitting assembly to provide additional resistance to nut back-off.

5. The assembly of claim 1 wherein the nut has an internally threaded front end portion that extends axially beyond a non-threaded front end of the tube body before the spring has expanded over the serrated annular surface of the tube body to allow the nut to be hand tightened part way onto external threads on a male fitting assembly.

6. The assembly of claim 5 wherein the tube body has a smaller spring centering diameter than the serrated annular surface adjacent a rear end of the serrated annular surface for self-centering of the nut and spring on the spring centering diameter during the initial hand tightening of the nut on the male fitting assembly.

7. The assembly of claim 6 wherein leading edges of the spring arm end portions and a shoulder on the tube body between the serrated annular surface and the smaller spring centering diameter have substantially matching chamfers which cause a ramping action of the spring arm end portions up onto the serrated annular surface during continued tightening of the nut on the male fitting assembly.

8. The assembly of claim 1 wherein the spring arm end portions are fully engaged with the serrations when the nut is fully torqued on a male fitting assembly.

9. The assembly of claim 8 wherein the serrations are formed by providing a plurality of circumferentially spaced axially extending grooves in the annular surface of the tube body.

10. The assembly of claim 9 wherein rear ends of the grooves and trailing edges of the spring arm end portions have substantially matching radiuses which cause quick lifting of the spring arm end portions out of the grooves during back-off of the nut from the fully torqued position.

11. The assembly of claim 1 wherein the spring arms are preloaded to cause the spring arm end portions to fully engage the serrations when the nut is fully torqued on a male fitting assembly.

12. The assembly of claim 1 wherein the tube body has a visual torque indicator that is covered by the nut during initial tightening of the nut onto a male fitting assembly and becomes visible only when the nut is fully torqued on the male fitting assembly.

13. The assembly of claim 12 wherein the visual torque indicator comprises a band on the tube body.

14. The assembly of claim 13 wherein the band has a contrasting color for easy visibility.

15. The assembly of claim 1 wherein the nut has a cavity in a rearwardly facing end that is shaped to receive the spring only when a front side of the spring is facing the cavity, thereby preventing the spring from being inserted backwards into the cavity.

16. The assembly of claim 15 wherein the nut has a radial recess into which the spring is movable radially outwardly after being inserted axially into the cavity for retaining the spring inside the nut.

17. The assembly of claim 16 wherein the spring has an outwardly protruding fin intermediate where the pair of spring arms are connected together that snaps into a radial slot in the nut during radial outward movement of the spring into the recess to lock the spring inside the nut.

18. The assembly of claim 16 wherein the nut has an end wall that shrouds the spring when the spring is moved radially outwardly into the recess to prevent removal of the spring from the nut during tightening of the nut on a male fitting assembly.

19. A coupling assembly comprising a male fitting assembly and a female fitting assembly for connecting to the male fitting assembly to form a fluid tight connection therebetween, the female fitting assembly including a tube body having a non-threaded exterior annular surface containing a plurality of circumferentially spaced axially extending serrations, and a nut axially and rotatably movable relative to the tube body, the nut having a generally U-shape spring fixedly connected to the nut, the spring having a pair of laterally spaced arms that extend in substantially the same direction on opposite sides of the tube body when the nut is inserted over the tube body, the nut having an internally threaded front end portion for threadedly engaging external threads on the male fitting assembly, the spring arms having end portions that are engageable with the serrations on the opposite sides of the tube body during tightening and loosening of the nut on the male fitting assembly to provide increased resistance to turning of the nut relative to the tube body.

20. The assembly of claim 19 wherein the serrations are symmetrical and have rounded sides, and the spring arm end portions are shaped to provide less resistance to turning of the nut in a tightening direction when threaded onto the male fitting assembly than in the back-off direction when the nut is fully torqued on the male fitting assembly.

21. The assembly of claim 20 wherein the spring arm end portions have more contact area with the serrations in the back-off direction than in the tightening direction, causing more resistance to turning of the nut in the back-off direction than in the tightening direction.

22. The assembly of claim 21 wherein the contact area of the spring arm end portions have a steeper slope with the serrations in the back-off direction than in the tightening direction, causing more resistance to turning of the nut in the back-off direction than in the tightening direction.

23. The assembly of claim 2 wherein the serrations have convex rounded axially extending sides, and the spring arm end portions have flat surfaces that establish line contact with the serrations in the tightening direction to reduce the amount of friction therebetween during turning of the nut in the tightening direction.

24. The assembly of claim 23 wherein the spring arm end portions have curved surfaces that match the curvature of the serrations to establish a larger amount of contact with the serrations in the back-off direction to increase the amount of friction therebetween during turning of the nut in the back-off direction.

* * * * *